United States Patent
Uemura

(10) Patent No.: US 8,276,448 B2
(45) Date of Patent: *Oct. 2, 2012

(54) SENSOR DEVICE WITH TIMEWISE LINKED SENSING SIGNALS

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

This patent is subject to a terminal disclaimer.

(21) Appl. No.: 12/632,066

(22) Filed: Dec. 7, 2009

(65) Prior Publication Data
US 2010/0154540 A1    Jun. 24, 2010

(30) Foreign Application Priority Data

Dec. 19, 2008   (JP) .................................. 2008-323685

(51) Int. Cl.
*G01P 3/00* (2006.01)
*G01P 15/00* (2006.01)
(52) U.S. Cl. ..................... 73/511; 73/514.01; 73/504.12
(58) Field of Classification Search ..................... 73/511, 73/510, 504.12, 504.14, 504.16, 514.32, 73/514.29, 493, 514.01
See application file for complete search history.

(56) References Cited

U.S. PATENT DOCUMENTS

| | | | | |
|---|---|---|---|---|
| 5,095,750 | A * | 3/1992 | Suzuki et al. ............... | 73/514.19 |
| 5,935,191 | A | 8/1999 | Sakanashi et al. | |
| 5,939,630 | A | 8/1999 | Nozoe et al. | |
| 6,044,707 | A * | 4/2000 | Kato ......................... | 73/504.14 |
| 6,067,488 | A | 5/2000 | Tano | |
| 6,584,845 | B1 * | 7/2003 | Gutierrez et al. ........... | 73/514.15 |
| 6,876,926 | B2 * | 4/2005 | Kirkland et al. .............. | 701/505 |
| 7,028,546 | B2 * | 4/2006 | Hoshal ......................... | 73/489 |
| 7,234,351 | B2 * | 6/2007 | Perkins ......................... | 73/493 |
| 7,243,561 | B2 * | 7/2007 | Ishigami et al. ............. | 73/866.1 |
| 7,281,406 | B2 | 10/2007 | Mase | |
| 7,289,898 | B2 * | 10/2007 | Hong et al. ..................... | 701/96 |
| 7,337,669 | B2 | 3/2008 | Nozoe | |
| 7,730,782 | B2 * | 6/2010 | Uemura ..................... | 73/504.12 |
| 2004/0064252 | A1 | 4/2004 | Kirkland et al. | |
| 2010/0154539 | A1 * | 6/2010 | Uemura ..................... | 73/504.03 |

FOREIGN PATENT DOCUMENTS

CN    1154741 A    7/1997
(Continued)

OTHER PUBLICATIONS

Kourogi et al; "A method of personal positioning based on sensor data fusion of wearable camera and self-contained sensors", Multisensor Fusion and Integration for Intelligent Systems, MF12003. Jul. 30-Aug. 1, 2003, pp. 287-292, XP010658336, ISBN:978-0-7803-7987-9 Cited in the European Office Action for EP 09 178 581.6-1236 dated Nov. 11, 2011.
Full English translation of JP-07-239236 A, previously submitted in Information Disclosure Statement submitted Mar. 30, 2011.
European Office action for EP 09 178 581.6-1236 dated Nov. 11, 2011.

(Continued)

*Primary Examiner* — Helen C. Kwok
(74) *Attorney, Agent, or Firm* — Pearne & Gordon

(57) ABSTRACT

An sensor device with high detection accuracy. The sensor device includes an angular velocity sensor for outputting an angular velocity sensing signal, an acceleration sensor for outputting an acceleration sensing signal, and an output circuit for outputting the angular velocity sensing signal and the acceleration sensing signal. The output circuit outputs signals in a digital format according to the time-division system, so as to link timewise the angular velocity sensing signal and the acceleration sensing signal detected at the same timing as one signal.

4 Claims, 2 Drawing Sheets

FOREIGN PATENT DOCUMENTS

| | | |
|---|---|---|
| CN | 1174144 A | 2/1998 |
| CN | 1603842 A | 9/2008 |
| JP | 07-239236 A | 9/1995 |
| JP | 2005-283481 A | 10/2005 |

OTHER PUBLICATIONS

European Search Report for EP09-178581 dated Mar. 3, 2011.
Chinese Office Action for Application No. 200810187137.7 dated May 5, 2011.

* cited by examiner

SENSOR DEVICE WITH TIMEWISE LINKED SENSING SIGNALS

BACKGROUND OF THE INVENTION

1. Field of the Invention

The present invention relates to sensor devices used in electronic devices and vehicles, including digital cameras and automobile navigation systems.

2. Background Art

As shown in FIG. 3, a conventional sensor device includes angular velocity sensor 1 for outputting an angular velocity sensing signal, and acceleration sensor 2 for outputting an acceleration sensing signal.

A prior art related to the present invention is disclosed, for example, in Japanese Patent Unexamined Publication No. 2005-283481.

However, the conventional sensor device has a disadvantage of its low detection accuracy.

Let's take an example of an automobile navigation system in a vehicle equipped with the above conventional sensor device. More specifically, let's assume that the vehicle is traveling in a multistory parking lot. The sensor device uses gravitational acceleration information from acceleration sensor 2 for correcting angular velocity information from angular velocity sensor 1. This enables detection of a spiral travel of the vehicle in the multistory parking lot.

However, in the conventional sensor device, an output on gravitational acceleration from acceleration sensor 2 and an output on angular velocity sensor 1 are not linked timewise. Accordingly, if there is a difference in signal transmission time between a circuit of angular velocity sensor 1 and a circuit of acceleration sensor 2, the angular velocity information cannot be accurately corrected using the gravitational acceleration information from acceleration sensor 2. This results in low detection accuracy.

SUMMARY OF THE INVENTION

An object of the present invention is to improve the detection accuracy of sensor device.

To achieve this object, the present invention includes an output circuit for outputting an angular velocity sensing signal and an acceleration sensing signal detected at the same timing in a digital format according to the time-division system, so as to link these signals timewise.

This structure enables output of the angular velocity sensing signal and the acceleration sensing signal linked timewise as one signal. Accordingly, the angular velocity sensing signal can be accurately corrected using the acceleration sensing signal. As a result, the detection accuracy of sensor device improves.

DETAILED DESCRIPTION OF THE INVENTION

First Exemplary Embodiment

Figure 1:
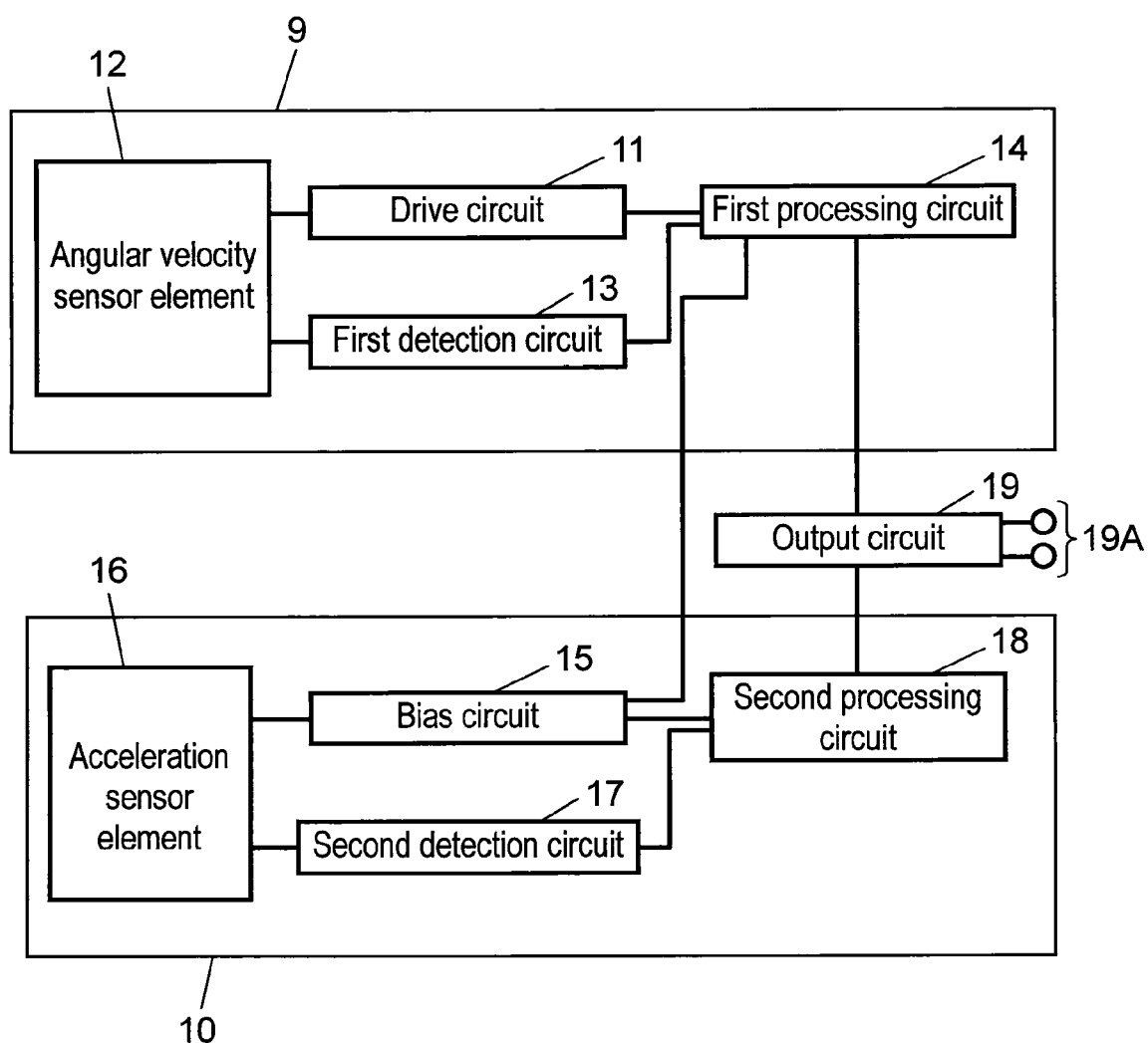
FIG. 1 is an electrical circuit diagram of an sensor device in accordance with a first exemplary embodiment of the present invention.
Figure 2:
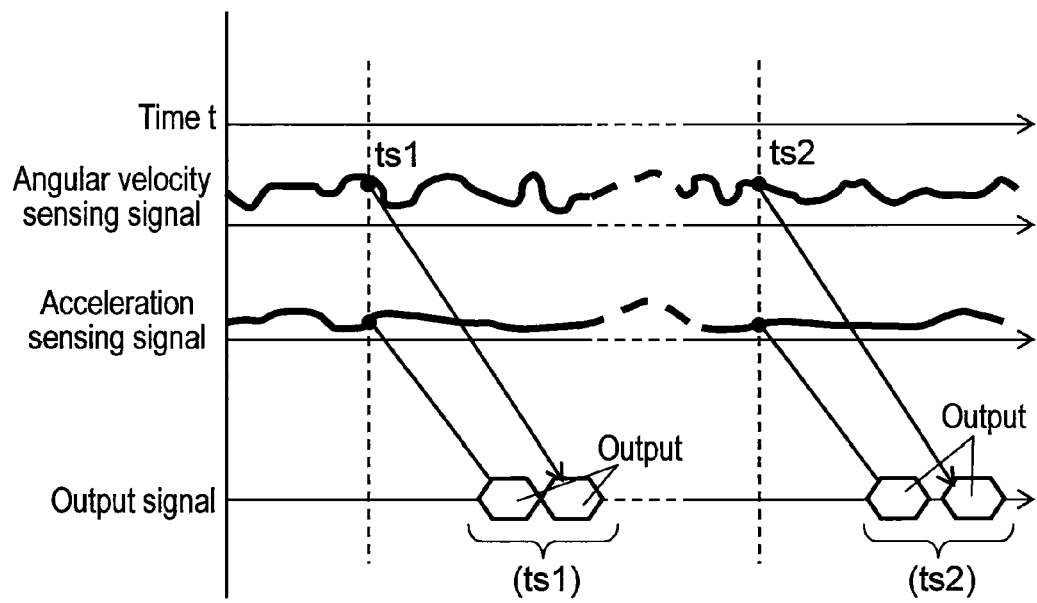
FIG. 2 illustrates changes in an output signal from the sensor device in accordance with the first exemplary embodiment of the present invention.
Figure 3:
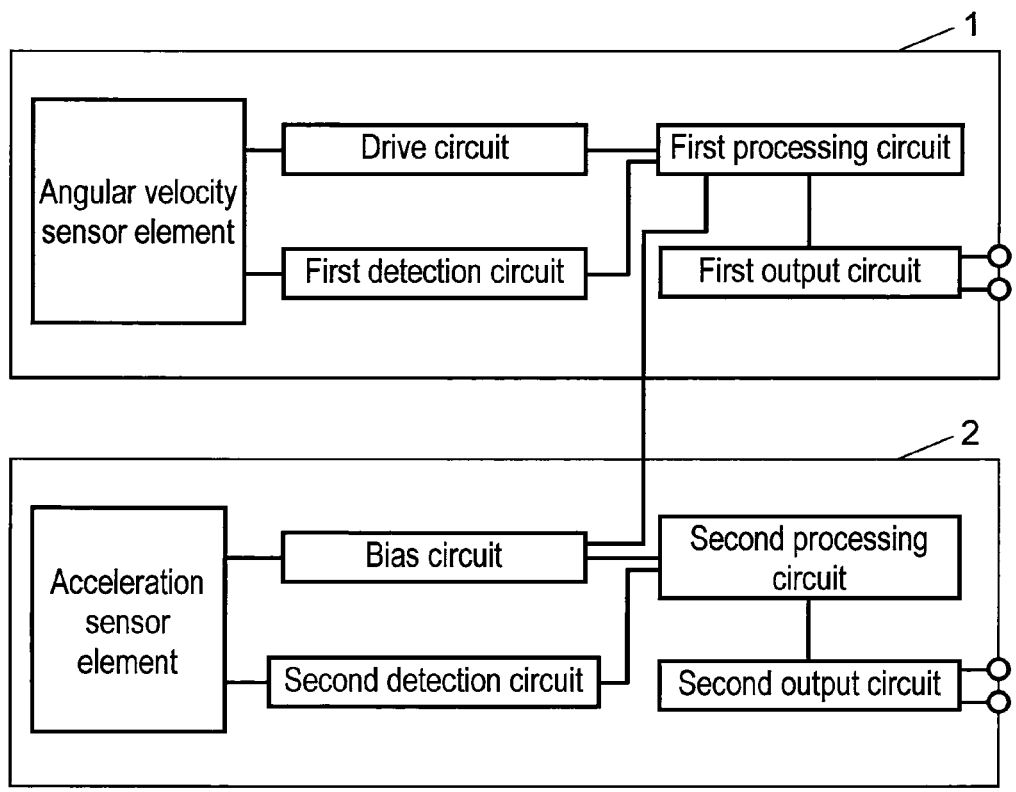
FIG. 3 is an electrical circuit diagram of a conventional sensor device.

An sensor device in the first exemplary embodiment is described below with reference to FIGS. 1 and 2. FIG. 1 is an electrical circuit diagram of the sensor device in the first exemplary embodiment of the present invention. FIG. 2 illustrates changes in an output signal of the sensor device in the first exemplary embodiment.

In FIG. 1, the sensor device includes angular velocity sensor 9 for outputting an angular velocity sensing signal, acceleration sensor 10 for outputting an acceleration sensing signal, and output circuit 19 for outputting the angular velocity sensing signal and the acceleration sensing signal.

Angular velocity sensor 9 includes drive circuit 11 for outputting a drive signal that drives an angular velocity sensor element, and angular velocity sensor element 12 that receives the drive signal from drive circuit 11. Angular velocity sensor 9 also includes detection circuit 13 for taking out a response signal from angular velocity sensor element 12, and first processing circuit 14 that receives a response signal from first detection circuit 13. First processing circuit 14 extracts and outputs the angular velocity sensing signal from the response signal.

Acceleration sensor 10 includes bias circuit 15 for outputting a bias signal, and acceleration sensor element 16 that receives the bias signal. Acceleration sensor 10 also includes second detection circuit 17 for taking out a response signal from acceleration sensor element 16, and second processing circuit 18 that receives a response signal from second detection circuit 17. Second processing circuit 18 extracts and outputs the acceleration sensing signal from the response signal.

In the sensor device in this exemplary embodiment, as shown in FIG. 2, output circuit 19 outputs in a digital format according to the time-division system the angular velocity sensing signal and the acceleration sensing signal detected at ts1 point, i.e., the angular velocity sensing signal and the acceleration sensing signal detected at the same timing, so as to link these signals timewise.

If an A/D converter is provided in output circuit 19, instead of providing it in first and second detection circuits 13 and 17 or first and second processing circuits 14 and 18, a chopper needs to be provided before the A/D converter so as to separate to analog angular velocity signal and analog acceleration signal for output.

If the A/D converter (not illustrated) is provided in first and second detection circuits 13 and 17 or first and second processing circuits 14 and 18, the chopper is not necessarily provided before the A/D converter (not illustrated).

With this structure, the angular velocity sensing signal and the acceleration sensing signal can be linked timewise as one signal. This enables accurate correction of the angular velocity sensing signal using the acceleration sensing signal. Accordingly, the detection accuracy of the sensor device can be improved.

Next is described an example of an automobile navigation system in a vehicle equipped with the sensor device in the first exemplary embodiment. Let's say this vehicle is traveling in a multistory parking lot. The sensor device corrects the angular velocity sensing signal from angular velocity sensor 9, using gravitational acceleration information included in the acceleration sensing signal from acceleration sensor 10, and detects a spiral travel of the vehicle in the multistory parking lot. On detecting this spiral travel, the sensor device in this exemplary embodiment can accurately correct the angular velocity information based on the gravitational acceleration information from acceleration sensor 10, even if there is a time difference in signal transmission between a circuit of angular velocity sensor 9 and a circuit of acceleration sensor 10. This is because the acceleration sensing signal including the gravitational acceleration information from acceleration sensor 10 and the angular velocity sensing signal from angular velocity sensor 9 are linked timewise. As a result, the detection accuracy of the sensor device can be improved.

Next is described a specific method of linking timewise the angular velocity sensing signal and the acceleration velocity sensing signal detected at the same timing, and outputting these signals as one signal.

First, a time difference in signal transmission between the circuit of angular velocity sensor 9 and the circuit of acceleration sensor 10 is calculated. If the signal transmission time in the circuit of angular velocity sensor 9 is shorter than the signal transmission time in the circuit of acceleration sensor 10, a delay circuit is provided in angular velocity sensor 9. Contrarily, if the signal transmission time in the circuit of acceleration sensor 10 is shorter than the signal transmission time in the circuit of angular velocity sensor 9, a delay circuit is provided in acceleration sensor 10.

With this structure, the angular velocity sensing signal and the acceleration sensing signal detected at the same timing are input to output circuit 19 at the same timing. The angular velocity sensing signal and the acceleration sensing signal detected at the same timing can thus be linked timewise and output as one signal when output circuit 19 sequentially outputs the angular velocity sensing signal and the acceleration sensing signal.

Another method is to provide a time-point information measurement unit for calculating time-point information, and adding this time-point information to the angular velocity sensing signal and the acceleration sensing signal. Then, output circuit 19 links the angular velocity sensing signal and the acceleration sensing signal having the same time-point information, and outputs these signals as one signal.

What is claimed is:

1. An sensor device comprising:
   an angular velocity sensor for outputting an angular velocity sensing signal;
   an acceleration sensor for outputting an acceleration sensing signal; and
   an output circuit for outputting the angular velocity sensing signal and the acceleration sensing signal;
   wherein the output circuit links timewise the angular velocity sensing signal and the acceleration sensing signal detected at the same timing and outputs, in a digital format according to a time division system, a linked angular velocity sensing signal and acceleration sensing signal as one signal.

2. The sensor device of claim 1, wherein the angular velocity sensor includes:
   a drive circuit for outputting a drive signal that drives an angular velocity sensor element;
   the angular velocity sensor element for receiving the drive signal from the drive circuit;
   a first detection circuit for taking a response signal from the angular velocity sensor element; and
   a first processing circuit for receiving the response signal from the first detection circuit, the first processing circuit extracting and outputting the angular velocity sensing signal from the response signal.

3. The sensor device of claim 1, wherein the acceleration sensor includes:
   a bias circuit for outputting a bias signal; an acceleration sensor element for receiving the bias signal:
   a second detection circuit for taking a response signal from the acceleration sensor element; and
   a second processing circuit for receiving the response signal from the second detection circuit, the second processing circuit extracting and outputting the acceleration sensing signal from the response signal.

4. The sensor device of claim 1, wherein a delay circuit is provided in one of the angular velocity sensor and the acceleration sensor.

* * * * *